United States Patent
Li (10) Patent No.: US 9,912,620 B2
(45) Date of Patent: Mar. 6, 2018

(54) METHOD, SYSTEM AND DEVICE FOR IMPLEMENTING AN INSTANT MESSAGING APPLICATION

(71) Applicant: Tencent Technology (Shenzhen) Company Limited, Shenzhen (CN)

(72) Inventor: Wei Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 418 days.

(21) Appl. No.: 14/613,698

(22) Filed: Feb. 4, 2015

(65) Prior Publication Data

US 2015/0149928 A1    May 28, 2015

Related U.S. Application Data

(63) Continuation of application No. PCT/CN2013/080388, filed on Jul. 30, 2013.

(30) Foreign Application Priority Data

Aug. 13, 2012    (CN) .......................... 2012 1 0286516

(51) Int. Cl.
  G06F 21/31    (2013.01)
  H04L 12/58    (2006.01)
  H04L 29/06    (2006.01)
  H04L 29/08    (2006.01)

(52) U.S. Cl.
  CPC .......... H04L 51/046 (2013.01); H04L 51/04 (2013.01); H04L 63/083 (2013.01); H04L 67/20 (2013.01); G06F 21/31 (2013.01)

(58) Field of Classification Search
  CPC ...... G06F 21/31; H04L 51/046; H04L 51/054
  See application file for complete search history.

(56) References Cited

U.S. PATENT DOCUMENTS

| 7,020,687 B2 | 3/2006 | Mooney et al. |
| 8,341,221 B2 * | 12/2012 | Verlare ................ G06Q 10/107 |
| | | 709/204 |
| 2006/0168553 A1 * | 7/2006 | Drennan ................... G06F 8/20 |
| | | 717/100 |
| 2008/0136784 A1 * | 6/2008 | Neoh ...................... G06F 3/044 |
| | | 345/173 |

(Continued)

FOREIGN PATENT DOCUMENTS

| CN | 1929455 A | 3/2007 |
| CN | 101043332 A | 9/2007 |

OTHER PUBLICATIONS

PCT Search Report for PCT/CN2013/080388, dated Oct. 31, 2013.
CN 20121028565168, Office Action Chinese Office Action dated Oct. 19, 2017 including English Translation, 11 pages.

*Primary Examiner* — David Choi
(74) *Attorney, Agent, or Firm* — Patterson + Sheridan, LLP (57) ABSTRACT

A method for an instant messaging application is disclosed comprising receiving source data sent from a third party server, wherein a tag of the instant messaging application is embedded in the source data; and implementing a function of the instant messaging application, on a third party interface displayed based on the source data, based on a script or a Software Development Kit of the instant messaging application and the tag of the instant messaging application. Also disclosed is relevant system and devices.

20 Claims, 5 Drawing Sheets

(56) References Cited

U.S. PATENT DOCUMENTS

2011/0010316 A1* 1/2011 Hamilton, II .......... G06N 3/006
    706/12
2015/0149928 A1* 5/2015 Li ........................ H04L 51/046
    715/752

* cited by examiner

METHOD, SYSTEM AND DEVICE FOR IMPLEMENTING AN INSTANT MESSAGING APPLICATION

This application is a continuation application under 35 U.S.C. § 111(a) claiming priority under 35 U.S.C. § 120 and 365(c) to International Application No. PCT/CN2013/080388, filed Jul. 30, 2013 which claims the priority benefit of Chinese patent application No. 201210286516.8 filed with the State Intellectual Property Office of the People's Republic of China on Aug. 13, 2012 and entitled "METHOD, SYSTEM AND DEVICE FOR IMPLEMENTING AN INSTANT MESSAGING APPLICATION", both of which are hereby incorporated by reference in their entireties.

TECHNICAL FIELD

The disclosure relates to Internet field and in particular to method, system and device for implementing an instant messaging application.

BACKGROUND

With the development of Internet, various instant messaging applications are becoming increasingly popular, allowing people to communicate conveniently. Existing instant messaging applications include, for example, QQ, Fetion, MSN, and so on.

The existing instant messaging applications may have a client version and a web version. In the client version, the instant messaging application has a client installed on a local client device and thus can be enabled on the local client device. In the web version, the instant messaging application is directly enabled in a web page corresponding to the instant messaging application. After enabling the instant messaging application by using an account and a password, regardless of the version thereof, it is possible to add friends in the instant messaging application on the local client device, and accounts, nicknames, avatars, personal particulars, and so on of respective contacts can be displayed. Furthermore, microblog links, space links, and some other link buttons of the friends can also be displayed on an interface of the instant messaging application, so that micro-blogs, spaces, and so on of the friends can be accessed quickly.

The inventor has found at least the following problems: the existing instant messaging applications can be utilized only in the above two versions, so its utilization is not flexible.

SUMMARY

In order to solve the problems in the prior art, embodiments of the disclosure provide a method, system and device for implementing an instant messaging application.

In one aspect, a method for an instant messaging application is provided, the method including: receiving source data sent from a third party server, wherein a tag of the instant messaging application is embedded in the source data; and implementing a function of the instant messaging application on a third party interface displayed based on the source data, based on a script or a Software Development Kit of the instant messaging application and the tag of the instant messaging application.

Optionally, in the above method, the implementing may include: displaying a user login window on the third party interface based on the script or the Software Development Kit of the instant messaging application and the tag of the instant messaging application; acquiring information of a first login user inputted in the user login window; sending the information of the first login user to a server of the instant messaging application based on an address of the server obtained by resolving the script or the Software Development Kit of the instant messaging application, so that the server of the instant messaging application detects whether the information of the first login user is correct; and displaying an instant messaging application identifier of the first login user on the third party interface based on the script or the Software Development Kit of the instant messaging application, when the information of the first login user is correct.

Optionally, in the above method, the instant messaging application identifier may include an account, a nickname, or an avatar of the first login user displayed based on the script or the Software Development Kit of the instant messaging application.

Optionally, in the above method, the implementing may further include: sending an access request carrying an account of a second login user to the server of the instant messaging application based on the address of the server obtained by resolving the script or the Software Development Kit of the instant messaging application, when an instant messaging application identifier of the second login user displayed on the third party interface is accessed; and receiving and displaying an information card of the second login user sent from the server of the instant messaging application, wherein the information card of the second login user includes personal basic information of the second login user.

Optionally, in the above method, the information card of the second login user may further include prompt information for a conversation with the second login user, and/or prompt information for adding the second login user as a friend.

Optionally, in the above method, the implementing may further include: sending a conversation request carrying the account of the first login user and the account of the second login user to the server of the instant messaging application based on the address of the server obtained by resolving the script or the Software Development Kit of the instant messaging application, when it is detected that the first login user requests a conversation with the second login user; and displaying a conversation window on the third party interface based on the script or the Software Development Kit of the instant messaging application, when the server of the instant messaging application permits the first login user to have a conversation with the second login user.

In another aspect, a method for an instant messaging application is provided, the method including: embedding a tag of the instant messaging application in source data based on a script or a Software Development Kit of the instant messaging application; and sending the source data in which the tag of the instant messaging application is embedded to a client device, so that the client device implements a function of the instant messaging application, on an interface displayed based on the source data, based on the script or the Software Development Kit of the instant messaging application and the tag of the instant messaging application.

In another aspect, a client device is provided, the client device including: a receiving module configured to receive source data sent from a third party server, wherein a tag of an instant messaging application is embedded in the source data; a processing module configured to implement a function of the instant messaging application, on a third party interface displayed based on the source data, based on a script or a Software Development Kit of the instant messaging application and the tag of the instant messaging application in the source data received by the receiving module.

Optionally, in the above client device, the processing module may be further configured to display a user login window on the third party interface based on the script or the Software Development Kit of the instant messaging application and the tag of the instant messaging application in the source data received by the receiving module; acquire information of a first login user inputted in the user login window; send the information of the first login user to a server of the instant messaging application based on an address of the server obtained by resolving the script or the Software Development Kit of the instant messaging application, so that the server of the instant messaging application detects whether the information of the first login user is correct; and display an instant messaging application identifier of the first login user on the third party interface based on the script or the Software Development Kit of the instant messaging application, when the information of the first login user is correct.

Optionally, in the above client device, the instant messaging application identifier may include an account, a nickname, or an avatar of the first login user displayed based on the script or the Software Development Kit of the instant messaging application.

Optionally, in the above client device, the processing module may be further configured to send an access request carrying an account of a second login user to the server of the instant messaging application based on the address of the server obtained by resolving the script or the Software Development Kit of the instant messaging application, when an instant messaging application identifier of the second login user displayed on the third party interface is accessed; and receive and display an information card of the second login user sent from the server of the instant messaging application, wherein the information card of the second login user includes personal basic information of the second login user.

Optionally, in the above client device, the information card of the second login user may further include prompt information for a conversation with the second login user, and/or prompt information for adding the second login user as a friend.

Optionally, in the above client device, the processing module may be further configured to send a conversation request carrying the account of the first login user and the account of the second login user to the server of the instant messaging application based on the address of the server obtained by resolving the script or the Software Development Kit of the instant messaging application, when it is detected that the first login user requests a conversation with the second login user; and display a conversation window on the third party interface or a third party web page based on the script or the Software Development Kit of the instant messaging application, when the server of the instant messaging application permits the first login user to have a conversation with the second login user.

In another aspect, a server device is provided, the server device including: an embedding module configured to embed a tag of an instant messaging application in source data based on a script or a Software Development Kit of the instant messaging application; and a sending module configured to send the source data in which the tag of the instant messaging application is embedded to a client device, so that the client device implements a function of the instant messaging application, on an interface displayed based on the source data, based on the script or the Software Development Kit of the instant messaging application and the tag of the instant messaging application.

In another aspect, a system for implementing an instant messaging application is provided, wherein the system includes a third party server device and any one of the above client devices, and the third party server device is the above server device.

In another aspect, a client device is provided. The client device includes one or more processors and a memory storing one or more programs, wherein the one or more programs are configured to be executed by the one or more processors, and the one or more programs contains instructions operable to: receive source data sent from a third party server, wherein a tag of an instant messaging application is embedded in the source data; implement a function of the instant messaging application, on a third party interface displayed based on the source data, based on a script or a Software Development Kit of the instant messaging application and the tag of the instant messaging application.

Optionally, the implementing may include: displaying a user login window on the third party interface based on the script or the Software Development Kit of the instant messaging application and the tag of the instant messaging application; acquiring information of a first login user inputted in the user login window; sending the information of the first login user to a server of the instant messaging application based on an address of the server, which is obtained by resolving the script or the Software Development Kit of the instant messaging application, so that the server of the instant messaging application detects whether the information of the first login user is correct; and displaying an instant messaging application identifier of the first login user on the third party interface based on the script or the Software Development Kit of the instant messaging application, when the information of the first login user is correct.

Optionally, the instant messaging application identifier may include an account, a nickname, or an avatar of the first login user displayed based on the script or the Software Development Kit of the instant messaging application.

Optionally, the implementing may further include: sending an access request carrying an account of a second login user to the server of the instant messaging application based on the address of the server obtained by resolving the script or the Software Development Kit of the instant messaging application, when an instant messaging application identifier of the second login user displayed on the third party interface is accessed; and receiving and displaying an information card of the second login user sent from the server of the instant messaging application, wherein the information card of the second login user includes personal basic information of the second login user.

Optionally, the information card of the second login user may further include prompt information for a conversation with the second login user, and/or prompt information for adding the second login user as a friend.

Optionally, the implementing may further include: sending a conversation request carrying the account of the first login user and the account of the second login user to the server of the instant messaging application based on the address of the server obtained by resolving the script or the Software Development Kit of the instant messaging application, when it is detected that the first login user requests a conversation with the second login user; and displaying a conversation window on the third party interface based on the script or the Software Development Kit of the instant messaging application, when the server of the instant messaging application permits the first login user to have a conversation with the second login user.

In yet another aspect, a server device is provided. The server device includes one or more processors and a memory storing one or more programs, the one or more programs being configured to be executed by the one or more processors, and the one or more programs containing instructions operable to: embed a tag of an instant messaging application in source data based on a script or a Software Development Kit of the instant messaging application; send the source data in which the tag of the instant messaging application is embedded to a client device, so that the client device implements a function of the instant messaging application, on an interface displayed based on the source data, based on the script or the Software Development Kit of the instant messaging application and the tag of the instant messaging application.

In the methods, systems and devices for instant messaging application provided by the embodiments of the disclosure, the source data sent from the third party server is received in which the tag of the instant messaging application is embedded, and the function of the instant messaging application is implemented, on the third party interface displayed based on the source data, based on the script or the Software Development Kit of the instant messaging application and the tag of the instant messaging application. With the technical solutions of the embodiments of the disclosure, the instant messaging application can be conveniently utilized on the third party interface, whereby the instant messaging application can be used in more scenes and used more flexibly. Furthermore, embedding the tag of the instant messaging application in the source data in the embodiments of the disclosure can be considered as an implementation of Hyperlink. Functions of the instant messaging application can be implemented on the third party interface based on the tag and the script or Software Development Kit of the instant messaging application, which is easy to implement and convenient to operate. Furthermore, with the technical solutions of the embodiments of the disclosure, instant messaging services can be efficiently facilitated, the frequency of using the instant messaging services can be increased, and the scope of using the instant messaging services can be expanded.

BRIEF DESCRIPTION OF DRAWINGS

In order to illustrate the technical solutions of the embodiments of the disclosure more clearly, accompany drawings employed in the descriptions of the embodiments are simply illustrated below. Obviously, the accompany drawings in the following descriptions show merely embodiments of the disclosure, and other accompany drawings are available to those skilled in the art on the basis of these accompany drawings without inventive efforts.

DETAILED DESCRIPTION

Embodiment 1

Figure 1:
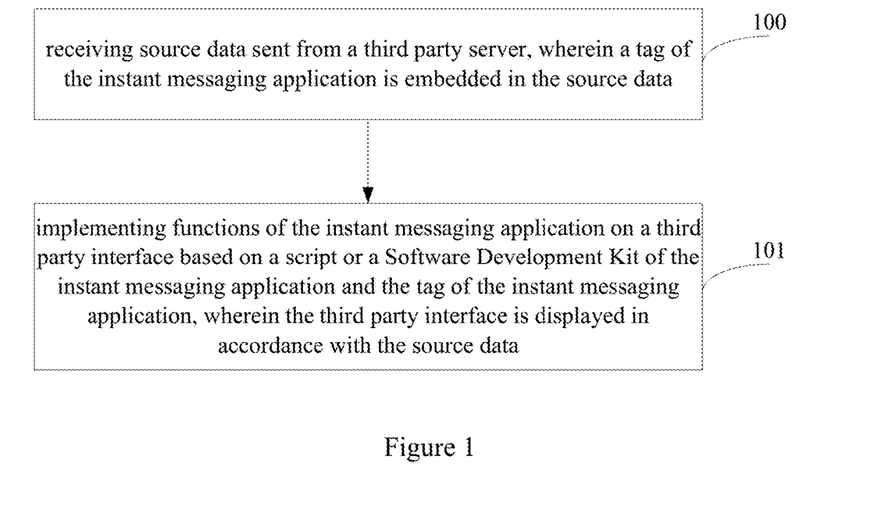
FIG. 1 is a flow chart of a method for implementing an instant messaging application provided by a first embodiment of the disclosure.

FIG. 1 is a flow chart of a method for implementing an instant messaging application provided by a first embodiment of the disclosure. The method for implementing the instant messaging application of the embodiment can be performed by a client device, and specifically by, for example, a browser on the client device. As shown in FIG. 1, the method for implementing the instant messaging application of the embodiment may specifically include the following steps:

100, source data sent from a third party server is received, wherein a tag of the instant messaging application is embedded in the source data.

In the embodiment, the tag of the instant messaging application is a hyperlink tag capable of linking to a server of the instant messaging application based on a script or a Software Development Kit of the instant messaging application. For example, in the embodiment, the tag of the instant messaging application may be a customized tag, which can be resolved based on the script or the Software Development Kit of the instant messaging application. In the embodiment, the number of the embedded tags of the instant messaging application can be set as required.

In the embodiment, both the script and the Software Development Kit of the instant messaging application are developed by an instant messaging application company and available to the third party server and respective client devices after being issued by the instant messaging application company. In the embodiment, either of the script and the Software Development Kit of the instant messaging application can be used to implement the technical solutions of the disclosure.

101, a function of the instant messaging application is implemented, on a third party interface displayed based on the source data, based on the script or the Software Development Kit of the instant messaging application and the tag of the instant messaging application.

For example, the tag of the instant messaging application can be hyperlinked to some link information in the script or the Software Development Kit of the instant messaging application, and then an address of a server of the instant messaging application can be obtained by resolving the link information based on the script or the Software Development Kit of the instant messaging application. A request corresponding to the link information is sent to the server of the instant messaging application, information returned by the server of the instant messaging application in response to the request is received, and the returned information is displayed on the third party interface based on the script or the Software Development Kit of the instant messaging application, so that the function of the instant messaging application can be implemented on the third party interface. For example, the third party interface in the embodiment may be a third party web page or a third party application interface. The following embodiments are described taking the third party web page or the third party application interface as an example of the third party interface.

The method for implementing the instant messaging application in the embodiment will be described at the client device.

In the method for implementing the instant messaging application provided by the embodiment, the source data sent from the third party server is received, wherein the tag of the instant messaging application is embedded in the source data; and the functions of the instant messaging application are implemented on the third party interface, which is displayed in accordance with the source data, based on the tag of the instant messaging application and the script or the Software Development Kit of the instant messaging application. By the technical solution of the embodiment, the instant messaging application can be conveniently utilized on the third party interface, so the utilization scenes of the instant messaging application increase, and the utilization of the instant messaging application is versatile. Furthermore, embedding the tag of the instant messaging application in the source data in the embodiment can be considered as an implementation of Hyperlink functions. Functions of the instant messaging application can be implemented on the third party interface based on the tag and the script or the Software Development Kit of the instant messaging application, which is easy to implement and operationally convenient. Furthermore, by the technical solution of the embodiment, instant messaging services can be efficiently stimulated, the utilization frequency of the instant messaging services can be increased, and the utilization scope of the instant messaging services can be expanded.

Optionally, in the technical solution of the embodiment shown in FIG. 1, the step 101 specifically includes the following steps:

(1) A user login window is displayed on the third party web page or the third party application interface based on the script or the Software Development Kit of the instant messaging application and the tag of the instant messaging application.

In the embodiment, the tag of the instant messaging application can be considered as a tag which is hyperlinked to the user login interface of the instant messaging application. The user login interfaces of existing instant messaging applications may be applied to the user login window displayed on the third party web page or the third party application interface.

(2) Information of a first login user inputted in the user login window is acquired.

Specifically, the information of the first login user can include an account and a password. The account is configured for uniquely identifying the first login user and the password is set by the first login user when registering with the instant messaging application. In order to ensure login security, the information of the first login user can further include a randomly generated security verification code and so on, details of which can be found in relevant prior arts, and thus are not redundantly described herein.

Specifically, acquiring the information of the first login user inputted in the user login window can be receiving the information of the first login user inputted by the user via a man-machine interface module on the client device.

(3) The information of the first login user is sent to the server of the instant messaging application based on the address of the server, which is obtained by resolving the script or the Software Development Kit of the instant messaging application, so that the server of the instant messaging application detects whether the information of the first login user is correct.

The script or the Software Development Kit of the instant messaging application is developed when the instant messaging application was developed, and can be issued by the instant messaging application company and acquired by the third party server or the client device as required. Furthermore, the address of the server of the instant messaging application can be obtained by resolving the script or the Software Development Kit of the instant messaging application. In the embodiment, the information of the first login user is sent to the server of the instant messaging application based on the address of the server, so that the server of the instant messaging application detects whether the information of the first login user is correct. When the server of the instant messaging application verifies that the information of the first login user is correct, it will send a "correct" response to the client device, and then step (4) is performed. When the server of the instant messaging application verifies that the information of the first login user is incorrect, it will send an "incorrect" response to the client device and prompt the first login user to input login information again on the third party web page or the third party application interface on the client device.

(4) When the information of the first login user is correct, an instant messaging application identifier of the first login user is displayed on the third party web page or the third party application interface based on the script or the Software Development Kit of the instant messaging application.

For example, the instant messaging application identifier may include an account, a nickname, or an avatar of the first login user displayed based on the script or the Software Development Kit of the instant messaging application. Specifically, another operation prompt, for example, viewing card information, starting a conversation and so on, can also be invisibly displayed on the instant messaging application identifier. In practice, it is possible that when a mouse is positioned over the instant messaging application, options such as viewing card information, starting a conversation and so on are displayed, so that the first login user of the client device performs a corresponding operation in accordance with the prompt.

For example, in a game having an instant messaging application embedded on an interface of the game, with the technical solution of the embodiment, when a user logs on to the game by a traditional way, the user can log on to the instant messaging application on the interface of the game; and when the user successfully logs on to the instant messaging application, an instant messaging application identifier can be displayed around the user in the interface of the game to indicate that the user has already logged on to the instant messaging application in the game.

Further optionally, in the technical solution of the above embodiment, step 101 may include the following steps:

(a) When the instant messaging application identifier of a second login user displayed on the third party web page or the third party application interface is accessed, an access request carrying the account of the second login user is sent to the server of the instant messaging application based on the address of the server, which is obtained by resolving the script or the Software Development Kit of the instant messaging application.

In the embodiment, it is preferable that the second login user logs on to the instant messaging application via another client device different from the current client device. The login process of the second login user is the same as that of the first login user, so it is not redundantly described herein.

(b) An information card of the second login user sent from the server of the instant messaging application is received and displayed. The information card of the second login user includes personal basic information of the second login user. The personal basic information of the second login user at least includes the account, and can further include at least one of a nickname, a micro-blog address, a space address, a customized signature, a contact telephone number, an email address, and so on.

Preferably, the steps (a) and (b) are performed after the steps (1)-(4) in the above embodiment. For example, in the third party application, only after the user of the current client device logs on to the third party application, the user is allowed to click and view information cards of other users who have already logged on to the third party application.

For example, the information card of the second login user can further include prompt information for a conversation with the second login user, and/or prompt information for adding the second login user as a friend.

For example, in the above embodiment, after viewing the information card of the second login user, the first login user can determine whether to have a conversation with the second login user or whether to add the second login user as a friend.

In the embodiment, the tag of the instant messaging application can be considered as a tag which is hyperlinked to the instant messaging application in order to view friend information.

Further optionally, in the technical solution of the above embodiment, the step 101 can include the following steps:

(i) When it is detected that the first login user requests a conversation with the second login user, a conversation request carrying the account of the first login user and the account of the second login user is sent to the server of the instant messaging application based on the address of the server, which is obtained by resolving the script or the Software Development Kit of the instant messaging application.

As both the first login user and the second login user have already logged on to the instant messaging application on the third party web page or the third party interface, the account of the first login user and the account of the second login user can be acquired. Specifically, the first login user can request conversation with the second login user after viewing the card information of the second login user by clicking prompt information of "having a conversation with the second login user" in the card information, or clicking a conversation option displayed when the mouse is positioned over the instant messaging application identifier, or other modes, which are not limited herein.

When the server of the instant messaging application detects that both the first login user and the second login user satisfy a conversation condition, the client device can display a conversation window on the third party web page or the third party application interface based on the script or the Software Development Kit of the instant messaging application.

In the embodiment, the tag of the instant messaging application can be considered as a tag which is hyperlinked to the instant messaging application in order to have a conversation with a friend.

It should be noted that in the above embodiment, implementing the function of the instant messaging application on the third party web page or the third party application interface is described by taking login, viewing card information and having a conversation as examples. In practice, other functions of instant messaging application can also be implemented on the third party web page or the third party application interface by the above described way.

It should be noted that the instant messaging application in the above embodiment can be QQ, Fetion, or MSN and so on.

By the method for implementing the instant messaging application provided by the above embodiment, the instant messaging application can be conveniently utilized on the third party web page or the third party application interface, so the utilization scenes of the instant messaging application increase, and the utilization of the instant messaging application is versatile. Furthermore, embedding the tag of the instant messaging application in the source data in the embodiment can be considered as an implementation of Hyperlink functions. The functions of the instant messaging application can be implemented on the third party web page or the third party application interface based on the tag and the script or the Software Development Kit of the instant messaging application, which is easy to implement and operationally convenient. Furthermore, by the technical solution of the embodiment, instant messaging services can be efficiently stimulated, the utilization frequency of the instant messaging services can be increased, and the utilization scope of the instant messaging services can be expanded.

Embodiment 2

Figure 2:
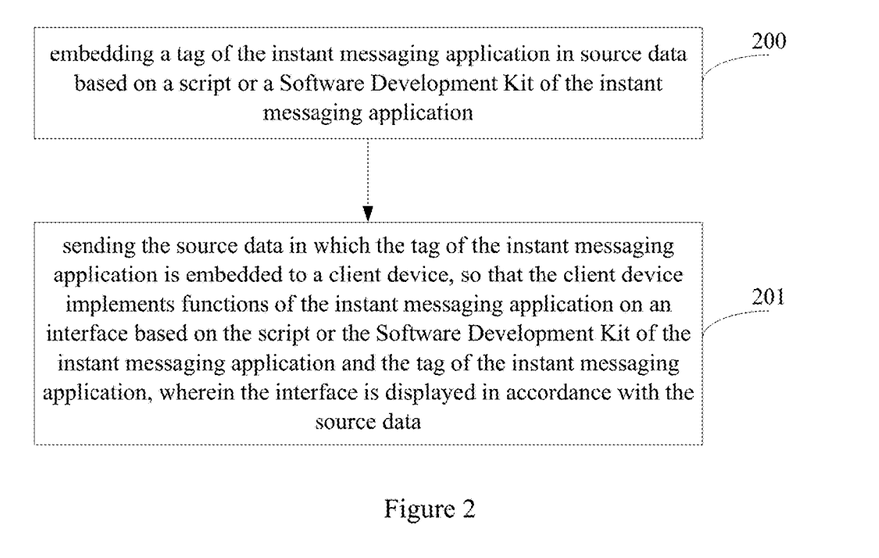
FIG. 2 is a flow chart of a method for implementing an instant messaging application provided by a second embodiment of the disclosure.

FIG. 2 is a flow chart of a method for implementing an instant messaging application provided by a second embodiment of the disclosure. The method for implementing the instant messaging application of the embodiment is performed by a server, and specifically by a third party server, for example a server of a third party web page or a third party application. The method for implementing the instant messaging application in the embodiment may include the following steps:

200, a tag of the instant messaging application is embedded in source data based on a script or a Software Development Kit of the instant messaging application.

In the embodiment, the tag of the instant messaging application is a hyperlink tag capable of linking to the server of the instant messaging application based on the script or the Software Development Kit of the instant messaging application. For example, the tag of the instant messaging application in the embodiment can be a customized tag, which can be resolved based on the script or the Software Development Kit of the instant messaging application.

In the embodiment, both the script and the Software Development Kit of the instant messaging application are developed by an instant messaging application company, and are available to the third party server and respective client devices after being issued by the instant messaging application company. In the embodiment, either of the script and the Software Development Kit of the instant messaging application can be used to implement the technical solution of the disclosure.

201, the source data in which the tag of the instant messaging application is embedded is sent to the client device, so that the client device implements functions of the instant messaging application on an interface based on the script or the Software Development Kit of the instant messaging application and the tag of the instant messaging application, wherein the interface is displayed in accordance with the source data.

In the embodiment, the interface can specifically refer to a web page or an application interface, wherein the web page is the third party web page, and the application interface is the third party application interface.

The method for implementing the instant messaging application in the embodiment differs from the embodiment shown in FIG. 1 merely in: the embodiment shown in FIG. 1 is performed on the client device side, and the present embodiment is performed on the server side, for example on the third party server. Details of the embodiment are the same as those of the embodiment shown in FIG. 1, so they are not redundantly described herein.

In the method for implementing the instant messaging application provided by the embodiment, the tag of the instant messaging application is embedded in the source data based on the script of the Software Development Kit of the instant messaging application, and the source data in which the tag of the instant messaging application is embedded is sent to the client device, so that the client device implements the functions of the instant messaging application on the interface, which is displayed in accordance with the source data, based on the script or the Software Development Kit of the instant messaging application. By the technical solution of the embodiment, the instant messaging application can be conveniently utilized on the web page or the application interface, so the utilization scenes of the instant messaging application increase, and the utilization of the instant messaging application is versatile. Furthermore, embedding the tag of the instant messaging application in the source data in the embodiment can be considered as an implementation of Hyperlink functions. Functions of the instant messaging application can be implemented on the web page or the application interface based on the tag and the script or the Software Development Kit of the instant messaging application, which is easy to implement and operationally convenient. Furthermore, by the technical solution of the embodiment, instant messaging services can be efficiently stimulated, the utilization frequency of the instant messaging services can be increased, and the utilization scope of the instant messaging services can be expanded.

It should be noted that the instant messaging application in the above embodiment can be QQ, Fetion, or MSN, and so on.

Embodiment 3

Figure 3:
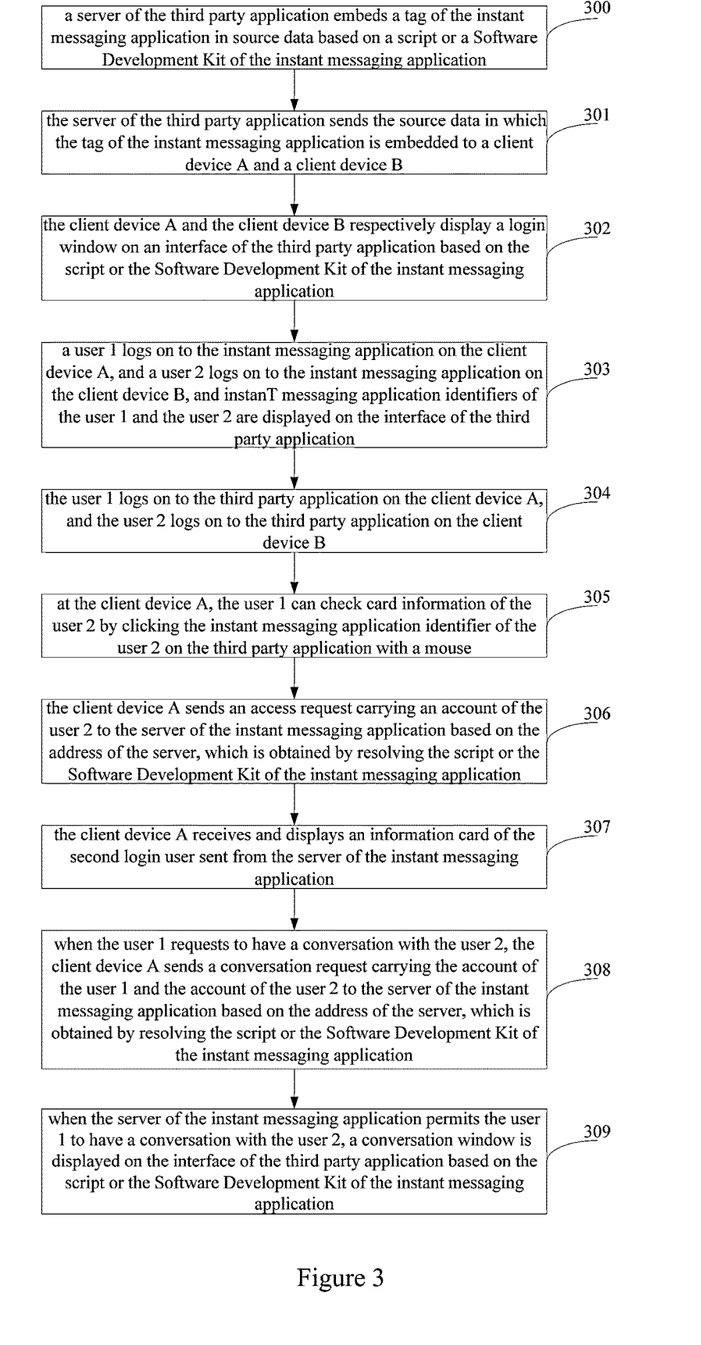
FIG. 3 is a flow chart of a method for implementing an instant messaging application provided by a third embodiment of the disclosure.

FIG. 3 is a flow chart of a method for implementing an instant messaging application provided by a third embodiment of the disclosure. The embodiment is described by taking two users logging on to an instant messaging application in a third application as an example. As shown in FIG. 3, the method for implementing the instant messaging application in the embodiment may include the following steps:

300, a server of the third party application embeds a tag of the instant messaging application in source data based on a script or a Software Development Kit of the instant messaging application.

301, the server of the third party application sends the source data, in which the tag of the instant messaging application is embedded, to a client device A and a client device B.

302, the client device A and the client device B respectively display a login window on an interface of the third party application respectively displayed based on the script or the Software Development Kit of the instant messaging application.

For example, the tag of the instant messaging application embedded in the source data can be considered as a hyperlink tag for login.

303, a user 1 logs on to the instant messaging application on the client device A, a user 2 logs on to the instant messaging application on the client device B, and instant messaging application identifiers of the user 1 and the user 2 are displayed on the interfaces of the third party application.

304, the user 1 logs on to the third party application on the client device A, and the user 2 logs on to the third party application on the client device B.

Here, the step 303 and the step 304 can be performed in any order.

305, at the client device A, the user 1 can view card information of the user 2 by clicking the instant messaging application identifier of the user 2 on the third party application with a mouse.

Here, it can be considered as that the user 1 requests to view the card information of the user 2.

306, the client device A sends an access request carrying an account of the user 2 to the server of the instant messaging application based on the address of the server, which is obtained by resolving the script or the Software Development Kit of the instant messaging application.

Here, the tag of the instant messaging application embedded in the source data can be considered as a hyperlink tag for viewing the card information.

307, the client device A receives and displays an information card of the second login user sent from the server of the instant messaging application.

The following steps may be further included:

308, when the user 1 requests to have a conversation with the user 2, the client device A sends a conversation request carrying the account of the user 1 and the account of the user 2 to the server of the instant messaging application based on the address of the server, which is obtained by resolving the script or the Software Development Kit of the instant messaging application.

309, when the server of the instant messaging application permits the user 1 to have a conversation with the user 2, a conversation window is displayed on the interface of the third party application based on the script or the Software Development Kit of the instant messaging application.

In such a way, the user 1 can have a conversation with the user 2. The specific conversation implementing process is the same as the conversation implementing mechanism between two users in the prior art, and thus is not redundantly described herein.

It should be noted that in the above embodiment, the process of implementing the function of the instant messaging application on the third party application interface are described by taking login, viewing card information and having a conversation as examples. In practice, other functions of the instant messaging application can also be implemented on the third party application interface by the above described way. The embodiment is described by taking two users as an example. In practice, the number of users in the third party application is not limited, and the number of client devices for login is not limited.

Similarly, the instant messaging application in the above embodiment can be QQ, Fetion, or MSN and so on.

In the method for implementing the instant messaging application provided by the embodiment, the tag of the instant messaging application is embedded in the source data based on the script or the Software Development Kit of the instant messaging application, and the source data in which the tag of the instant messaging application is embedded is sent to the client device, so that the client device implements the functions of the instant messaging application on the web page or the application interface, which is displayed in accordance with the source data, based on the script or the Software Development Kit of the instant messaging application. By the technical solution of the embodiment, the instant messaging application can be conveniently utilized on the web page or the application interface, so the utilization scenes of the instant messaging application increase, and the utilization of the instant messaging application is versatile. Furthermore, embedding the tag of the instant messaging application in the source data in the embodiment can be considered as an implementation of Hyperlink functions. The functions of the instant messaging application can be implemented on the web page or the application interface based on the tag and the script or the Software Development Kit of the instant messaging application, which is easy to implement and operationally convenient. Furthermore, by the technical solution of the embodiment, instant messaging services can be efficiently stimulated, the utilization frequency of the instant messaging services can be increased, and the utilization scope of the instant messaging services can be expanded.

Embodiment 4

Figure 4:
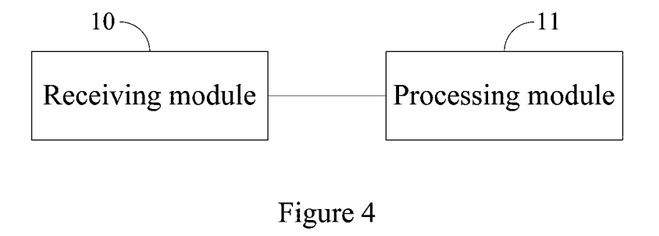
FIG. 4 is a structure diagram of a client device provided by a fourth embodiment of the disclosure.

FIG. 4 is a structure diagram of a client device provided by a fourth embodiment of the disclosure. As shown in FIG. 4, the client device in the embodiment can specifically include a receiving module 10 and a processing module 11.

The receiving module 10 receives source data sent from a third party server, wherein a tag of an instant messaging application is embedded in the source data. The processing module 11 is connected to the receiving module 10, and is configured to implement functions of the instant messaging application on a third party interface based on a script or a Software Development Kit of the instant messaging application and the tag of the instant messaging application, wherein the third party interface is displayed in accordance with the source data. For example, in the embodiment, the tag of the instant messaging application can be a customized tag, which can be resolved based on the script or the Software Development Kit of the instant messaging application. In the embodiment, the number of the embedded tags of the instant messaging application can be set as required.

The process of implementing the instant messaging application with the above modules by the client device in the embodiment is the same as that of the above process embodiment. So details of the embodiment are not redundantly described herein.

In the embodiment, the client device receives the source data in which the tag of the instant messaging application is embedded sent from a third party server and implements functions of the instant messaging application on a third party interface, which is displayed in accordance with the source data, based on the script or the Software Development Kit of the instant messaging application and the tag of the instant messaging application by the above modules. By the technical solution of the embodiment, the instant messaging application can be conveniently utilized on the third party interface, so the utilization scenes of the instant messaging application increase, and the utilization of the instant messaging application is versatile. Furthermore, embedding the tag of the instant messaging application in the source data in the embodiment can be considered as an implementation of Hyperlink functions. Functions of the instant messaging application can be implemented on the third party interface based on the tag and the script or the Software Development Kit of the instant messaging application, which is easy to implement and operationally convenient. Furthermore, by the technical solution of the embodiment, instant messaging services can be efficiently stimulated, the utilization frequency of the instant messaging services can be increased, and the utilization scope of the instant messaging services can be expanded.

Optionally, the processing module 11 in the above embodiment can be specifically configured to display a user login window on the third party interface based on the script or the Software Development Kit of the instant messaging application and the tag of the instant messaging application in the source data received by the receiving module 10; acquire information of a first login user inputted in the user login window; send the information of the first login user to a server of the instant messaging application based on an address of the server, which is obtained by resolving the script or the Software Development Kit of the instant messaging application, so that the server of the instant messaging application detects whether the information of the first login user is correct; and display an instant messaging application identifier of the first login user on the third party interface based on the script or the Software Development Kit of the instant messaging application, when the information of the first login user is correct.

Further optionally, the instant messaging application identifier may include an account, a nickname, or an avatar of the first login user displayed based on the script or the Software Development Kit of the instant messaging application.

Optionally, the processing module 11 in the above embodiment can also be specifically configured to send an access request carrying an account of a second login user to the server of the instant messaging application based on the address of the server, which is obtained by resolving the script or the Software Development Kit of the instant messaging application, when an instant messaging application identifier of the second login user displayed on the third party interface is accessed; and receive and display an information card of the second login user sent from the server of the instant messaging application, wherein the information card of the second login user includes personal basic information of the second login user.

Further optionally, the information card of the second login user may further include prompt information for a conversation with the second login user, and/or prompt information for adding the second login user as a friend.

Optionally, the processing module 11 in the above embodiment can also be specifically configured to send a conversation request carrying the account of the first login user and the account of the second login user to the server of the instant messaging application based on the address of the server, which is obtained by resolving the script or the Software Development Kit of the instant messaging application, when it is detected that the first login user requests a conversation with the second login user; and display a conversation window on the third party interface or a third party web page based on the script or the Software Development Kit of the instant messaging application, when the server of the instant messaging application permits the first login user to have a conversation with the second login user.

The process of implementing the instant messaging application with the above modules by the client device in the above embodiment is the same as that of the above process embodiment. So details of the embodiment are not redundantly described herein.

By the method for implementing the instant messaging application provided by the above embodiment, the instant messaging application can be conveniently utilized on a third party web page or a third party application interface, so the utilization scenes of the instant messaging application increase, and the utilization of the instant messaging application is versatile. Furthermore, embedding the tag of the instant messaging application in the source data in the embodiment can be considered as an implementation of Hyperlink functions. Functions of the instant messaging application can be implemented on the third party web page or the third party application interface based on the tag and the script or the Software Development Kit of the instant messaging application, which is easy to implement and operationally convenient. Furthermore, by the technical solution of the embodiment, instant messaging services can be efficiently stimulated, the utilization frequency of the instant messaging services can be increased, and the utilization scope of the instant messaging services can be expanded.

Embodiment 5

Figure 5:
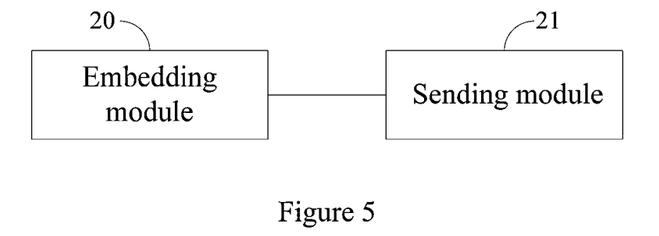
FIG. 5 is a structure diagram of a server device provided by a fifth embodiment of the disclosure.

FIG. 5 is a structure diagram of a server device provided by a fifth embodiment of the disclosure. As shown in FIG. 5, the server device in the embodiment can include an embedding module 20 and a sending module 21. The embedding module 20 is configured to embed a tag of an instant messaging application in source data based on a script or a Software Development Kit of the instant messaging application. The sending module is connected to the embedding module 20, and is configured to send the source data in which the tag of the instant messaging application is embedded to a client device, so that the client device implements functions of the instant messaging application on an interface based on the script or the Software Development Kit of the instant messaging application and the tag of the instant messaging application, wherein the interface is displayed in accordance with the source data.

The process of implementing the instant messaging application with the above modules by the server device in the above embodiment is the same as that of the above process embodiment. So details of the embodiment are not redundantly described herein.

In the embodiment, the server device embeds the tag of the instant messaging application in the source data based on the script or the Software Development Kit of the instant messaging application and send the source data in which the tag of the instant messaging application is embedded to the client device by the above modules, so that the client device implement the functions of the instant messaging application on the interface, which is displayed in accordance with the source data, based on the script or the Software Development Kit of the instant messaging application. By the technical solution of the embodiment, the instant messaging application can be conveniently utilized on a web page or an application interface, so the utilization scenes of the instant messaging application increase, and the utilization of the instant messaging application is versatile. Furthermore, embedding the tag of the instant messaging application in the source data in the embodiment can be considered as an implementation of Hyperlink functions. Functions of the instant messaging application can be implemented on the web page or the application interface based on the tag and the script or the Software Development Kit of the instant messaging application, which is easy to implement and operationally convenient. Furthermore, by the technical solution of the embodiment, instant messaging services can be efficiently stimulated, the utilization frequency of the instant messaging services can be increased, and the utilization scope of the instant messaging services can be expanded.

Embodiment 6

Figure 6:
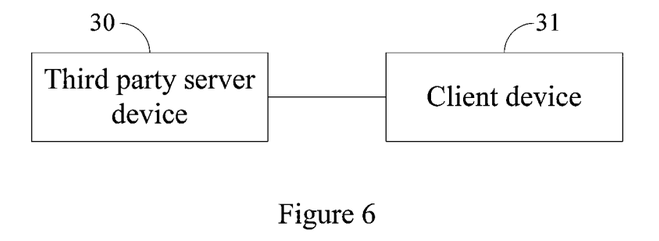
FIG. 6 is a structure diagram of a system for implementing an instant messaging application provided by a sixth embodiment of the disclosure.

FIG. 6 is a structure diagram of a system for implementing an instant messaging application provided by a sixth embodiment of the disclosure. As shown in FIG. 6, the system for implementing the instant messaging application of the embodiment can include a third party server device 30 and a client device 31. Specifically, the third party server device 30 can be a server device of a third party application or a third party network site.

The third party server device 30 is configured to embed a tag of the instant messaging application in source data based on a script or a Software Development Kit of the instant messaging application, wherein the tag of the instant messaging application is a hyperlink tag capable of linking to a server of the instant messaging application based on the script or the Software Development Kit of the instant messaging application. The third server device 30 is further configured to send the source data in which the tag of the instant messaging application is embedded to the client device 31.

The client device 31 is configured to receive the source data sent from the third party server device 30, and implement functions of the instant messaging application on a third party web page or a third party application interface, which is displayed in accordance with the source data, based on the tag of the instant messaging application in the received source data and the script or the Software Development Kit of the instant messaging application.

Specifically, the client device in the embodiment can be the client device shown in FIG. 4, and the third party server device 30 can be the server device shown in FIG. 5.

Specifically, the mechanism of mutual communication between the third party server device 30 and the client device 31 to implement the instant messaging application in the embodiment is the same as those described in the embodiments shown in FIGS. 1-3, and thus is not redundantly described herein.

By the system for implementing the instant messaging application in the embodiment, the instant messaging application can be conveniently utilized on the third party web page or the third party application interface, so the utilization scenes of the instant messaging application increase, and the utilization of the instant messaging application is versatile. Furthermore, embedding the tag of the instant messaging application in the source data in the embodiment can be considered as an implementation of Hyperlink functions. Functions of the instant messaging application can be implemented on the third party web page or the third party application interface based on the tag and the script or the Software Development Kit of the instant messaging application, which is easy to implement and operationally convenient. Furthermore, by the technical solution of the embodiment, instant messaging services can be efficiently stimulated, the utilization frequency of the instant messaging services can be increased, and the utilization scope of the instant messaging services can be expanded.

It should be noted that the above function modules are merely examples for describing the process of implementing the instant messaging application by the client device and the server device. In practice, the above functions can be assigned to different function modules to implement as required. That is, the internal structure of the device can be divided into different function modules to implement all or part of the above described functions. Furthermore, the client device and the server device provided by the above embodiment pertain to the same conception as the methods for implementing the instant messaging application. So details of the implementing process by the client device and the server device are the same as those of the method embodiments, and thus are not redundantly described herein.

Embodiment 7

Figure 7:
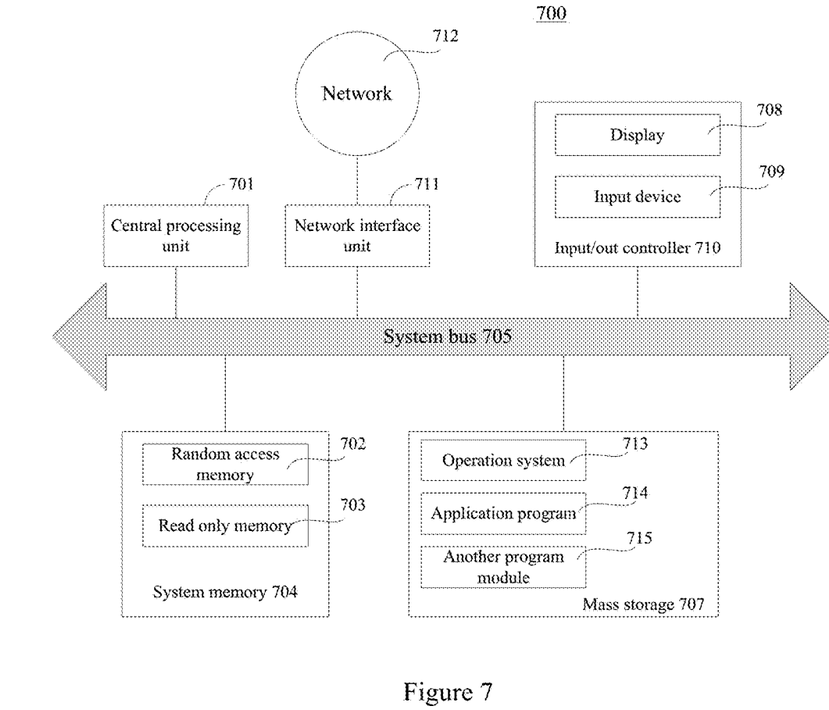
FIG. 7 is a structure diagram of a client device provided by a seventh embodiment of the disclosure.

FIG. 7 is a structure diagram of a client device provided by a seventh embodiment of the disclosure. The client device 700 can be a conventional desktop computer or laptop computer. The client device 700 includes a central processing unit (CPU) 701, a system memory 704 including a Random Access Memory (RAM) 702 and a Read Only Memory (ROM) 703, and a system bus 705 connecting the system memory 704 and the central processing unit 701. The client device 700 further includes a basic input/output system (I/O system) 706 for facilitating information communication among respective components in a computer, and a mass storage 707 for storing an operation system 713, an application program 714 and another program module 715.

The basic input/output system 706 includes a display 708 for displaying information and an input device 709 such as a mouse, a keyboard, and so on for inputting information by a user, wherein both the display 708 and the input device 709 are connected to the central processing unit 701 via an input-output controller 710 that is connected to the system bus 705. The basic input/output system 706 can further include the input/output controller 710 for receiving and processing inputs from a plurality of other devices such as a keyboard, a mouse, an electronic stylus and so son. Similarly, the input-output controller 710 further provides outputs to a display screen, a printer, or other types of output devices.

The mass storage 707 is connected to the central processing unit 701 via a mass storage controller (not shown) that is connected to the system bus 705. The mass storage 701 and its related computer readable medium provide a non-volatile memory for the client device 700. That is to say, the mass storage 707 can include a computer readable medium (not shown) such as a hard disk, or a CD-ROM driver.

Generally, the computer readable medium can include a computer storage medium and a communication medium. The computer storage medium includes volatile and non-volatile, removable and fixed medium implemented by any method or technology for storing information such as computer readable instructions, data structures, program modules or other data. The computer storage medium includes RAM, ROM, EPROM, EEPROM, Flash memory or other static storage, CD-ROM, DVD or other optical storage, magnetic cartridge, magnetic tape, magnetic disk storage or other magnetic storage device. Of course, a person skilled in the art will understand that the computer storage medium is not limited to the above. The system memory 704 and the mass storage 707 can be collectively referred as a memory.

In accordance with respective embodiments of the disclosure, the client device 700 can be further connected to a remote computer via a network such as Internet. That is, the client device 700 can be connected to a network 712 via a network interface unit 711 that is connected to the system bus 705, or can be connected to another type of network or a remote computer system (not shown) by the network interface unit 711.

The memory further includes one or more programs, which are stored in the memory and configured to be executed by one or more central processing units 601 for performing the method for implementing the instant messaging application provided by the embodiment shown in FIG. 1 and the method for implementing the instant messaging application provided by the embodiment shown in FIG. 3.

A person skilled in the art will understand that all or part of the steps implementing the above embodiments can be completed by hardware or programs instructing the hardware. The programs can be stored in a computer readable storage medium, which can be a read only memory, a disk, or an optical disk. The computer readable storage medium stores one or more programs, which are executed by one or more processors to perform the method for implementing the instant messaging application provided by the embodiment shown in FIG. 1 and the method for implementing the instant messaging application provided by the embodiment shown in FIG. 3.

Embodiment 8

Figure 8:
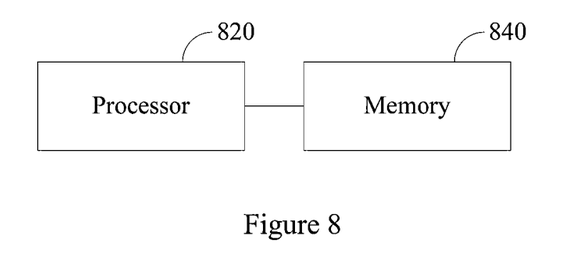
FIG. 8 is a structure diagram of a server device provided by an eighth embodiment of the disclosure.

FIG. 8 is a structure diagram of a server device provided by an eighth embodiment of the disclosure. As shown in FIG. 8, the server device 800 includes one or more processors 820 and a memory 840. The memory 840 stores one or more programs, which are configured to be executed by the one or more processors 820, the one or more programs containing instructions operable to embed a tag of an instant messaging application in the source data based on a script or a Software Development Kit of an instant messaging application, and send the source data in which the tag of the instant messaging application is embedded to the client device, so that the client device implements functions of the instant messaging application on an interface, which is displayed in accordance with the source data, based on the script or the Software Development Kit of the instant messaging application and the tag of the instant messaging application.

A person skilled in the art will understand that all or part of the steps implementing the above embodiments can be completed by hardware or programs instructing the hardware. The programs can be stored in a computer readable storage medium, which can be a read only memory, a disk, or an optical disk, and so son. The computer readable storage medium stores one or more programs which are executed by one or more processors to implement the method for implementing the instant messaging application provided by the embodiment shown in FIG. 2.

The serial numbers of the embodiments of the disclosure are merely for description, and do not represent a level of preference of the embodiments.

A person skilled in the art will understand that all or part of the steps implementing the above embodiments can be completed by hardware or programs instructing the hardware. The programs can be stored in a computer readable storage medium, which can be a read only memory, a disk, or an optical disk, and so son.

The above described embodiments are merely preferred embodiments of the disclosure, but not intended to limit the disclosure. Any modifications, equivalent alternations and improvements that are made within the spirit and scope of the disclosure should be included in the protection scope of the disclosure.

What is claimed is:

1. A computer-implemented method for implementing, in a computer game, functionality of a specified instant messaging platform external to the computer game, the computer-implemented method comprising:

receiving source data sent from a third party game server of a third party computer game, wherein a tag of a first party instant messaging platform is embedded in the source data, wherein the first party instant messaging platform is provided by a first party other than the third party and has an associated software development kit and an associated first party instant messaging client;

generating an initial interface of a third party game client of the third party computer game, based on the tag embedded in the source data, the initial interface including a user login window for the first party instant messaging platform, wherein the initial interface is output;

upon receiving, via the initial interface of the third party game client, information of a first login user of the first party instant messaging platform, sending the information of the first login user to a first party instant messaging server of the first party instant messaging platform via an address of the first party instant messaging server, wherein the address is obtained based on the software development kit of the first party instant messaging platform;

upon receiving an indication that the information of the first login user is confirmed by the first party instant messaging server to be correct, generating an updated interface of the third party game client, by operation of one or more computer processors, the updated interface including a first party instant messaging platform identifier of the first login user, wherein the updated interface is output;

subsequent to confirmation that the information of the first login user is correct, providing, via the third party game client: (i) non-instant-messaging functionality of the computer game and (ii) instant messaging functionality of the first party instant messaging platform without requiring access to the first party instant messaging client;

upon receiving, via the third party game client, a request from the first login user to engage in a conversation with a second login user of the first party instant messaging platform, generating a conversation request identifying the first and second login users, wherein the conversation request is sent to the first party instant messaging server; and upon approval of the conversation request, generating a conversation interface of the third party game client, wherein the conversation interface is output, whereafter the first and second login users engage in the conversation via the conversation interface.

2. The computer-implemented method of claim 1, wherein the first party instant messaging platform identifier comprises an account, a nickname, or an avatar of the first login user.

3. The computer-implemented method of claim 1, further comprising:

sending an access request carrying an account of the second login user to the first party instant messaging server via the address of the first party instant messaging server, when a first party instant messaging platform identifier of the second login user output via the third party game client is accessed; and receiving and displaying an information card of the second login user sent from the first party instant messaging server, wherein the information card of the second login user comprises personal basic information of the second login user.

4. The computer-implemented method of claim 3, wherein the information card of the second login user further comprises prompt information for a conversation with the second login user via the first party instant messaging platform, and/or prompt information for adding the second login user as a friend on the first party instant messaging platform.

5. A client device to implement, in a computer game, functionality of a specified instant messaging platform external to the computer game, the client device comprising:

one or more computer processors; and at least a memory having instructions stored thereon, the instructions when executed by the one or more processors causing the one or more computer processors to perform an operation comprising:

receiving source data sent from a third party game server of a third party computer game, wherein a tag of a first party instant messaging platform is embedded in the source data, wherein the first party instant messaging platform is provided by a first party other than the third party and has an associated software development kit and an associated first party instant messaging client;

generating an initial interface of a third party game client of the third party computer game, based on the tag embedded in the source data, the initial interface including a user login window for the first party instant messaging platform, wherein the initial interface is output;

upon receiving, via the initial interface of the third party game client, information of a first login user of the first party instant messaging platform, sending the information of the first login user to a first party instant messaging server of the first party instant messaging platform via an address of the first party instant messaging server, wherein the address is obtained based on the software development kit of the first party instant messaging platform; and upon receiving an indication that the information of the first login user is confirmed by the first party instant messaging server to be correct, generating an updated interface of the third party game client, the updated interface including a first party instant messaging platform identifier of the first login user, wherein the updated interface is output;

subsequent to confirmation that the information of the first login user is correct, providing, via the third party game client: (i) non-instant-messaging functionality of the computer game and (ii) instant messaging functionality of the first party instant messaging platform without requiring access to the first party instant messaging client;

upon receiving, via the third party game client, a request from the first login user to engage in a conversation with a second login user of the first party instant messaging platform, generating a conversation request identifying the first and second login users, wherein the conversation request is sent to the first party instant messaging server; and upon approval of the conversation request, generating a conversation interface of the third party game client, wherein the conversation interface is output, whereafter the first and second login users engage in the conversation via the conversation interface.

6. The client device of claim 5, wherein the first party instant messaging platform identifier comprises an account, a nickname, or an avatar of the first login user.

7. The client device of claim 5, wherein the operation further comprises:
    sending an access request carrying an account of the second login user to the first party instant messaging server via the address of the first party instant messaging server, when a first party instant messaging platform identifier of the second login user output via the third party game client is accessed; and
    receiving and displaying an information card of the second login user sent from the first party instant messaging server, wherein the information card of the second login user comprises personal basic information of the second login user.

8. The client device of claim 7, wherein the information card of the second login user further comprises prompt information for a conversation with the second login user via the first party instant messaging platform, and/or prompt information for adding the second login user as a friend on the first party instant messaging platform.

9. A non-transitory computer-readable medium having instructions stored thereon, the instructions executable to perform an operation to implement, in a computer game, functionality of a specified instant messaging platform external to the computer game, the operation comprising:
    receiving source data sent from a third party game server of a third party computer game, wherein a tag of a first party instant messaging platform is embedded in the source data, wherein the first party instant messaging platform is provided by a first party other than the third party and has an associated software development kit and an associated first party instant messaging client;
    generating an initial interface of a third party game client of the third party computer game, based on the tag embedded in the source data, the initial interface including a user login window for the first party instant messaging platform, wherein the initial interface is output;
    upon receiving, via the initial interface of the third party game client, information of a first login user of the first party instant messaging platform, sending the information of the first login user to a first party instant messaging server of the first party instant messaging platform via an address of the first party instant messaging server, wherein the address is obtained based on the software development kit of the first party instant messaging platform; and
    upon receiving an indication that the information of the first login user is confirmed by the first party instant messaging server to be correct, generating an updated interface of the third party game client, by operation of one or more computer processors when executing the instructions, the updated interface including a first party instant messaging platform identifier of the first login user, wherein the updated interface is output;
    subsequent to confirmation that the information of the first login user is correct, providing, via the third party game client: (i) non-instant-messaging functionality of the computer game and (ii) instant messaging functionality of the first party instant messaging platform without requiring access to the first party instant messaging client;
    upon receiving, via the third party game client, a request from the first login user to engage in a conversation with a second login user of the first party instant messaging platform, generating a conversation request identifying the first and second login users, wherein the conversation request is sent to the first party instant messaging server; and
    upon approval of the conversation request, generating a conversation interface of the third party game client, wherein the conversation interface is output, whereafter the first and second login users engage in the conversation via the conversation interface.

10. The non-transitory computer-readable medium of claim 9, wherein the first party instant messaging platform identifier comprises an account, a nickname, or an avatar of the first login user.

11. The non-transitory computer-readable medium of claim 9, wherein the operation further comprises:
    sending an access request carrying an account of the second login user to the first party instant messaging server via the address of the first party instant messaging server, when a first party instant messaging platform identifier of the second login user output via the third party game client is accessed; and
    receiving and displaying an information card of the second login user sent from the first party instant messaging server, wherein the information card of the second login user comprises personal basic information of the second login user.

12. The non-transitory computer-readable medium of claim 11, wherein the information card of the second login user further comprises prompt information for a conversation with the second login user via the first party instant messaging platform, and/or prompt information for adding the second login user as a friend on the first party instant messaging platform.

13. The computer-implemented method of claim 1, wherein the instant messaging functionality is accessible from within the third party game client without requiring logging in via the first party instant messaging client, wherein the software development kit is provided by the first party, wherein the tag of the first party instant messaging platform comprises a customized tag of the first party instant messaging platform;
    wherein the indication is received from the first party instant messaging server, wherein the first party instant messaging server is configured to confirm that the information of the first login user is correct.

14. The computer-implemented method of claim 13, wherein the first party instant messaging platform identifier is displayed based on, in respective instances, a script and the software development kit;
    wherein the first party instant messaging platform identifier comprises, in respective instances, an account, a nickname, and an avatar of the first login user.

15. The computer-implemented method of claim 14, further comprising:
    sending an access request carrying an account of the second login user to the first party instant messaging server via the address of the first party instant messaging server, wherein the address is obtained based on, in respective instances, the script and the software development kit of the first party instant messaging platform, when a first party instant messaging platform identifier of the second login user output via the third party game client is accessed; and receiving and outputting for display an information card of the second login user sent from the first party instant messaging server, wherein the information card of the second login user comprises personal basic information of the second login user.

16. The computer-implemented method of claim 15, wherein the information card of the second login user further comprises: prompt information for a conversation with the second login user via the first party instant messaging platform and prompt information for adding the second login user as a friend on the first party instant messaging platform;

wherein the third party game client permits the first login user to add the second login user as a friend on the first party instant messaging platform without requiring access to the first party instant messaging client.

17. The computer-implemented method of claim 1, wherein the third party game client permits the first login user to add the second login user as a friend on the first party instant messaging platform without requiring access to the first party instant messaging client.

18. The computer-implemented method of claim 1, wherein the tag of the first party instant messaging platform comprises a customized tag of the first party instant messaging platform.

19. The client device of claim 5, wherein the third party game client permits the first login user to add the second login user as a friend on the first party instant messaging platform without requiring access to the first party instant messaging client.

20. The non-transitory computer-readable medium of claim 9, wherein the third party game client permits the first login user to add the second login user as a friend on the first party instant messaging platform without requiring access to the first party instant messaging client.

* * * * *